(12) United States Patent
Bernard et al.

(10) Patent No.: US 7,037,363 B2
(45) Date of Patent: May 2, 2006

(54) MARKING LIQUIDS

(75) Inventors: Jörg Bernard, Albsheim (DE); Jörg Kowalczyk, Eisenberg/Steinborn (DE); Hans Scherrer, Lautersheim (DE)

(73) Assignee: Sudzucker Aktiengesellschaft, Mannheim/Ochsenfurt, Mannheim (DE)

( * ) Notice: Subject to any disclaimer, the term of this patent is extended or adjusted under 35 U.S.C. 154(b) by 300 days.

(21) Appl. No.: 10/617,235

(22) Filed: Jul. 11, 2003

(65) Prior Publication Data

US 2004/0103817 A1   Jun. 3, 2004

(30) Foreign Application Priority Data

Jul. 26, 2002   (DE) ............................... 102 34 191

(51) Int. Cl.
*C09D 11/16*   (2006.01)

(52) U.S. Cl. ................... 106/31.15; 106/31.36

(58) Field of Classification Search ............. 106/31.15, 106/31.36

See application file for complete search history.

(56) References Cited

U.S. PATENT DOCUMENTS 5,169,439 A   12/1992   Horvat et al.
5,486,550 A   1/1996   Lubas

FOREIGN PATENT DOCUMENTS

EP   1 036 833 A1   9/2000
JP   05320559 A   *   12/1993

\* cited by examiner

*Primary Examiner*—J. A. Lorengo
*Assistant Examiner*—Veronica F. Faison
(74) *Attorney, Agent, or Firm*—Dickstein, Shapiro, Morin & Oshinsky, LLP.

(57) ABSTRACT

The present invention pertains to an improved marking fluid that contains a sugar and/or a sugar alcohol, as well as methods for their manufacture.

20 Claims, No Drawings

MARKING LIQUIDS

FIELD OF THE INVENTION

The present invention pertains to an improved marking fluid and to a method for its manufacture.

BACKGROUND OF THE INVENTION

In marking inks or text markers, water-soluble dyes that fluoresce in the alkaline environment are used customarily. Such a dye is, for example, described in the German patent DE-PS 23 15 680 (hydroxypyrenetrisulfonic acid (Solvent Green 7 C.I. 59040)). This dye, which is also referred to as pyranine, can be used to highlight certain passages in texts clearly by painting over them. The fluid exhibits the advantage that the marking that is produced with it on a substrate is color intensive because of its day-glow paint-like character. Beyond that, the coloring effect occurs immediately after its application. One disadvantage of these inks, however, may be seen in their inadequate resistance to light. In the published German patent application DE-OS 24 41 823, it is suggested that the oxidative bleaching of the dyes, caused by the oxygen in the air, be eliminated by means of substances that have a reducing effect. DE 40 20 900 C1 is the source of marking fluids that contain saccharose, lactose, maltose, or monosaccharides that are derived from them. An improvement of photo-resistance is said to be achieved as a result of this measure. What has proven to be problematical in conjunction with this solution, however, is that the marker inks that are applied to paper quite quickly assume a brown color. This might be due to the fact that saccharose crystals that form are separated from the dye, and therefore, they no longer surround the dye in a protective manner.

The technical problem that underlies the present invention thus resides in providing marking fluids and methods for their manufacture that assure improved light-fastness and luminosity of the marker substance that is present in the fluid without the occurrence of color deteriorations after the marking fluid is applied to substrates.

BRIEF SUMMARY OF THE INVENTION

The present invention solves this technical problem by providing a marking fluid comprising at least one hydroxy-pyrenetrisulfonic acid or a derivative thereof, and at least one sugar or sugar alcohol, selected from the group consisting of palatinose, trehalose, trehalulose, 6-O-α-D-glucopyranosyl-D-sorbite, 1-O-α-D-glucopyranosyl-D-mannite, and maltite.

Surprisingly, it was found that one or more of the aforementioned sugars or sugar alcohols, when used in hydroxy-pyrenetrisulfonic acid-based maker fluids, markedly improve the light-fastness and the luminosity of the dye, without brown discoloration of the marking.

The aforementioned sugars and sugar alcohols, as well as their mixtures, can be manufactured simply and cost-effectively, and in an environmentally friendly manner from saccharose, for example, by means of an enzymatic transposition reaction, followed by hydration, if necessary, for the purpose of producing sugar alcohols, as described in the European patent EP 0 625 578 B1. With respect to the provision and compounding of the aforementioned sugars and sugar alcohols, as well as sugar/sugar alcohol mixtures, the content of the revelation of EP 0 625 578 B1 is included, in its entirety, in the present teaching. In a preferred embodiment form of the present invention, the marking fluid is free of saccharose, lactose, galactose, maltose, glucose and/or fructose.

DETAILED DESCRIPTION OF THE INVENTION

In a preferred embodiment form, the present invention pertains to a marking fluid of the aforementioned type, such that the sugar that is used is palatinose. By these means, a particularly pronounced improvement of light-fastness and luminosity is achieved.

In a particularly preferred embodiment form, provision is made to use, as the sugar or sugar alcohol, a mixture of the aforementioned sugars or sugar alcohols, especially a mixture of 1,6-GPS and 1,1-GPM. Such a mixture can, for example, be an equimolar mixture, thus Isomalt or Paltinit.® It is understood that provision can also be made to use mixtures that are enriched with 1,6-GPS or 1,1-GPM, that is, to use mixtures that contain 100% 1,6-GPS and 1,1-GPM, such that either 1,6-GPS is present in a greater quantity than 1,1-GPM, or 1,1-GPM is present in a greater quantity than 1,6-GPS. If necessary, provision can also be made so that in addition to these two sugar alcohols, 1-O-α-D-glucopyranosyl-D-sorbite (1,1-GPS), and/or mannite, sorbit, hydrated or unhydrated sugar alcohol oligomers are present.

In an additional embodiment form, the invention pertains to a marking fluid of the aforementioned type that is embodied as an aqueous solution and exhibits, preferably, an alkaline pH, especially of 8 to 14, preferably 9 to 11, most preferably, 9 to 10. To adjust and maintain the pH, buffer substances, such as sodium citrate, trishydroxymethylaminomethane, sodium carbonate, sodium hydroxide, for example, and/or buffer substances that have a similar effect, are added to the marking fluid.

In connection with the present invention, hydroxypyrenetrisulfonic acid is taken to mean 3-oxy-pyrene-5,8,10-trisulfonic acid, or its salt, especially its sodium salt (pyranine). Obviously, the invention also encompasses derivatives of this acid or the salt, to the extent that they are suitable as dayglow dyes.

Obviously, the marking fluid according to the invention can contain additional fluorescent or non-fluorescent dyes, which influence the shade, light-fastness, or intensity. Reactive Green 21, Direct Blue 199, Basic Violet 10, Basic Red 1, or Sirius Light Turquoise Blue may, preferably, be dyes of this type.

In an additional preferred embodiment form, the marking solution can, to good advantage, contain a moistening agent so that the marking fluid does not dry out in the tip of the applicator. Glycols, such as diglycol, for instance, diethylene glycol, or urea, for example, may be such moistening agents.

In another preferred embodiment form, the marking fluid exhibits a preservative, in order to reduce or eliminate harmful microbial effects. Such preservatives may be isothiazolinol derivatives, such as 1,2-benzothialozin-3-one-lithium salt, or N'-dodecyl-N-3-aminopropylglycine, for example.

In an another embodiment form, provision can be made, preferably, so that the flowing properties of the marking fluid, for example, are present as a result of modifying additives, such as surface-active substances, tensides, for example, and/or water-soluble binding agents, such as oil-free alkyde resins, for example.

In one embodiment form, the fluid according to the invention can also exhibit reducing agents, such as hydrazine, for example, its salts, hydroxylamine, its salts, sodium sulfite, sodium hydrogen sulfite, sodium dithionite, rongalite, or glyoxal sodium bisulfite.

In another preferred embodiment form, provision is made so that the content, in terms of sugar and/or sugar alcohol, is 5 to 50% by weight, with reference to the total fluid weight of the marking fluid. In another preferred embodiment form of the present invention, provision is made so that the content of pyranine in terms of the total fluid weight of the marking fluid is 0.5 to 8% by weight, preferably 0.5 to 3.0% by weight.

The present invention also pertains to methods for the manufacture of the aforementioned marking fluids. According to the invention, provision is made, initially, to manufacture an aqueous, alkaline dye mixture that contains all of the substances except for the sugars and sugar alcohols, thus, the dye pyranine, water, at least one preservative if necessary, the buffer substance if necessary, and, if necessary, the moistening agents. The sugar or sugar alcohol is introduced, either in dry form, or in a highly concentrated solution or suspension, to this aqueous alkaline solution, and mixed.

Other advantageous embodiments of the present invention result from the subsidiary claims.

The invention is illustrated in greater detail in what follows by virtue of the embodiment examples.

EXAMPLE

On the basis of a "dye mixture 1," made of 1.5–2 g Solvent Green 7 (8-hydroxypyrene-1,3,6-trisulfonic acid trisodium salt)
64 g of water, distilled
0.2 g Mergal K15 (preservative, containing 1,2-benzenethiazolin-3-one lithium salt+N'-dodecyl-N-3-aminopropylglycine)
3 g $Na_2CO_3$
3 g urea (moistening agent)
0.2 g NaOH, the following formulations were manufactured:
1. dye mixture 1+20 g palatinose
2. dye mixture 1+20 g Isomalt (50% 1,1-GPM, 50% 1,6-GPS)
3. dye mixture 1+20 g of maltite
4. dye mixture 1+10 g Palatinose+12.5 g sorbit solution (70% dry substance)
5. dye mixture 1+20 g Isomalt (75% 1,1-GPM, 25% 1,6-GPS)
6. dye mixture 1+25 g sorbit solution (70% dry substance) (comparison mixture)
7. dye mixture 1+20 g urea (comparison mixture)
8. dye mixture 1+20 g maltose (in keeping with DE 40 20 900) (comparison mixture)

The marker inks were applied to both normal paper and thermal fax paper. The marked papers were subjected to a test for light-fastness.

A combination of soda and sodium hydroxide were used as alkalis.

RESULTS

1. Formulation 1 exhibits a particularly high degree of light-fastness and luminosity (brilliance).
2. Formulations 2, 3, 4, and 5 exhibit a considerably improved light-fastness over formulations 6, 7, and 8. However, this is less than in formulation 1.

In order to change the wettabilty of the surface of the paper by the marking ink, a quantity of about 0.05 g of a tenside (Surfinol 465, for example) can be added (dye mixture 2).

Dye mixtures 1 and 2 yield yellow marker inks. Through the addition of, for example, about 1 g of Direct Blue 199 to dye mixture 1, a green fluorescent dye mixture 3 can be obtained, whose light-fastness and luminosity can be influenced in a manner analogous to formulations 1–8.

The invention claimed is:

1. A marking fluid comprising hydroxypyrenetrisulfonic acid or a derivative thereof and at least one sugar or sugar alcohol selected from the group consisting of palatinose, trehalulose, maltite, 6-O-α-D-glucopyranosyl-D-sorbite (1,6-GPS) and 1-O-α-D-glucopyranosyl-D-mannite (1,1-GPM).

2. A marking fluid according to claim 1, such that the marking fluid exhibits a pH of 8 to 14.

3. A marking fluid according to claim 2, such that the marking fluid exhibits a pH of 9 to 10.

4. A marking fluid according to claim 1, such that the marking fluid represents an aqueous fluid.

5. A marking fluid according to claim 1, such that the marking fluid contains a moistening agent.

6. A marking fluid according to claim 1, such that at least one additional dye is contained within the marking fluid.

7. A marking fluid according to claim 1, such that the marking fluid contains at least one preservative.

8. A marking fluid according to claim 7, such that the preservative is an isothiazolinone derivative.

9. A marking fluid according to claim 1, such that the marking fluid contains at least one buffer substance.

10. A marking fluid according to claim 9, such that the buffer substance is trishydroxymethylaminomethane, sodium citrate, sodium carbonate, and/or sodium hydroxide.

11. A marking fluid according to claim 1, such that the marking fluid contains at least one surface-active agent.

12. A marking fluid according to claim 1, such that the marking fluid contains at least one water-soluble binding agent.

13. A marking fluid according to claim 1, such that the sugar alcohol is a mixture of 1,6-GPS, and 1,1-GPM.

14. A marking fluid according to claim 1, such that the sugar or sugar alcohol is contained in a quantity of 5 to 50% by weight, relative to the total weight of the marking fluid.

15. A marking fluid according to claim 1, such that the hydroxypyrenetrisulfonic acid or its derivative is present in a quantity of 0.5 to 8% by weight, relative to the total weight of the marking fluid.

16. A marking fluid according to claim 5, in which the moistening agent comprises urea, a glycol or a diglycol.

17. A marking fluid according to claim 2, in which the marking fluid is an aqueous fluid and contains at least one member selected from the group consisting of moistening agent, additional dye, preservative, buffer, a surface-active agent and water-soluble binding agent.

18. A marking fluid according to claim 17, in which the sugar alcohol is at least one member of the group consisting of 1,6-GPS and 1,1-GPM.

19. A marking fluid according to claim 17, in which the moistening agent comprises urea, glycol or diglycol, the preservative is an isothiazolinone derivative, the buffer is trishydroxymethylaminomethane, sodium citrate, sodium carbonate, and/or sodium hydroxide, and in which the hydroxypyrenetrislufonic acid or its derivative and the sugar or sugar alcohol are present in a quantity of 0/5 to 8% by weight and 5 to 50% by weight, respectively, relative to the total weight of the marking fluid.

20. A method for the manufacture if a marking fluid comprising hydroxypyrenetrislufoflic acid or a derivative thereof, comprising providing the hydroxypyrenetrislufoflic acid or its derivative in water and combining the hydroxypyrenetrislufonic acid or derivative with at least one sugar or sugar alcohol selected from the group consisting of palatinose, trehalulose, 1,6-GPS, and 1,1-GPM.

* * * * *